Patented Apr. 25, 1939

2,155,907

UNITED STATES PATENT OFFICE 2,155,907

COLOR-STABLE PHENOLIC RESIN AND PROCESS OF MAKING SAME AND VARNISH CONTAINING SAME

John B. Rust, Orange, N. J., assignor to Ellis-Foster Company, a corporation of New Jersey No Drawing. Application November 25, 1935, Serial No. 51,475. Renewed March 1, 1937

15 Claims. (Cl. 260—19)

This invention relates to color-stable, oil-soluble, phenolic-acetaldehyde resins and the process of making same, having as a primary object the production of resins capable of yielding drier-color-stable, non-discoloring varnishes.

When phenol, i. e., carbolic acid, is reacted to form a resin with formaldehyde, oil-insoluble materials result which may only be rendered soluble in drying oils by fusing with a large excess of rosin or rosin esters. Likewise cresol or cresylic acid-formaldehyde resins, although oil-insoluble under ordinary varnish kettle practice (resin heated with full amount of oil to high temperature) may be rendered oil-soluble by treatment with small amounts of a drying oil.

Phenol when resinified with acetaldehyde produces a dark-colored resin which is, in general, oil-insoluble. However, cresol-acetaldehyde resin is readily oil-soluble but when made in the usual manner with acid condensing agents very dark colored varnishes result. In my copending application, Serial 39,621, (now Patent 2,142,076) I have described phenolic-acetaldehyde resins which are oil-soluble, non-discoloring and practically water white in color, that is, substantially lighter than WW rosin. The process comprises reacting cresols or other phenols preferably with gaseous acetaldehyde in the presence of oxalic acid or an equivalent compound as catalyst. When first prepared the reaction mixture is dark but upon heating above 180° C., heat-bleaching takes place and the resin changes from a dark brown to a pale amber color. These resins give very light colored varnishes which may be used for all coating purposes. They are especially useful in light pigmented enamels. Upon drying to a firm film the freshly prepared varnishes do not yellow or discolor. This is a valuable feature since the simple oil-soluble phenol-formaldehyde resins are not film-color-stable but acquire a yellow coloration upon drying. By the term film-color-stability I mean the formation of substantially non-discolored films.

I have now found that phenolic-acetaldehyde resin varnishes made heretofore, to which driers have been added, discolor upon storage in either metallic or glass containers. This discoloration is probably due to the formation in the varnish stored in the presence of oxygen of a red or purple-red dye, the formation being accelerated by the presence of varnish driers. By the term drier-color-stable varnish I mean a varnish to which driers have been added which does not discolor upon long storage. This term is distinct from the term film-color-stable, which was defined above.

The problem of the present invention, therefore, is to produce a phenolic-acetaldehyde resin substantially lighter in color than WW rosin, preferably from cresol or cresylic acid or a commercial grade of cresol known as meta-para cresol, said resin being capable of yielding film-color-stable and substantially drier-color-stable varnishes.

I have found that drier-color-stable varnish resins may be prepared from acetaldehyde and a phenol which has been pretreated with butyraldehyde or an aldehyde of higher molecular weight than butyraldehyde. In some cases methyl ethyl ketone or higher ketones may be substituted for the butyraldehyde. For instance, I may treat any phenol with butyraldehyde, benzaldehyde, heptaldehyde or methyl ethyl ketone, diethyl ketone or cyclohexanone. If, however, the phenol is pretreated with propionaldehyde or its ketonic equivalent acetone, drier-color-unstable varnish resins result.

The process described in my copending application, Serial 39,621, outlined above, may be used in the present invention to secure light-colored resins, since by the use of acid condensing agents other than oxalic acid or its equivalents, dark-colored resins are obtained, that is, resins substantially darker colored than WW rosin. In the pretreatment of the phenol I prefer to use proportions of butyraldehyde or methyl ethyl ketone not higher than ⅔ mole of the aldehyde or ketone to 1 mole of the phenol. The reaction of the phenol with butyraldehyde may be accelerated by the use of any acid condensing agent, but if an acid other than oxalic acid is used it must be removed by washing before resinification with acetaldehyde if light-colored resins are desired. When resinified with acetaldehyde in the presence of oxalic acid, the butyraldehyde-treated-phenol reaction product is at first dark colored, then when heated above 180° C. becomes heat-bleached to a pale amber-colored, hard, brittle resin.

Instead of pretreating the phenol with butyraldehyde or methyl ethyl ketone or higher aldehydes or ketones, the purified substituted butanes may be used, that is, α,α-diphenylolbutane or β,β-diphenylolbutane. I have found that diphenylol-substituted propanes and ethanes cannot be used since drier-color-unstable phenolic-acetaldehyde varnish resins result. The phenylolbutanes or substituted phenylolbutanes or any diphenylol-substituted hydrocarbons higher than butane, that is, substituted hydrocarbons containing 4 or more carbon atoms per hydrocarbon radical, yield phenolic-acetaldehyde drier-color-stable varnish resins. By the term diphenylol-substituted hydrocarbon, I mean any hydrocarbon containing two nuclei of phenol or its homologues.

In general, the drier-color-unstable resins give light colored varnishes when freshly prepared if the phenolic-acetaldehyde resin is made as described in my copending application, Serial 39,621. However, upon storage for one week to one month a deep red color develops. The varnishes made from the resins of the present invention, however, develop no color in the presence of driers even after two months storage.

The following are examples given better to illustrate the process of the present invention; all proportions being parts by weight.

*Example 1.*—216 parts of a commercial mixture of meta and para cresol are mixed with 72 parts of n-butyraldehyde and 2 parts of hydrochloric acid (specific gravity 1.19) are added. An exothermic reaction takes place and the temperature is maintained at 45°–50° C. by first cooling the mixture during the exothermic reaction then warming. Reaction is allowed to proceed for 6 to 10 hours. The acid is thoroughly eliminated by washing with water and 27 parts of oxalic acid are added to the condensation product. The mixture is then heated to 120° C. and 130 parts of gaseous acetaldehyde in admixture with illuminating gas is passed through it for about 3 hours. The dark resin which results is washed then heated to 220–230° C. to harden and heat-bleach. At 190° C. the color of the resin changes from a dark brown to a light amber, and at room temperature the final resin is hard, brittle, and substantially lighter in color than WW rosin.

*Example 2.*—100 parts of a commercial mixture of meta and para cresol are mixed with 100 parts of technical methyl ethyl ketone and 20 parts of hydrochloric acid (specific gravity 1.19) are added. The mixture is refluxed at boiling for 7 hours then the hydrochloric acid is removed by washing with water. 60 parts of the reaction product are mixed with 6 parts of oxalic acid and heated to 115° C. and 30 parts of gaseous acetaldehyde in admixture with illuminating gas is passed through it for about 4 hours. The dark resin which results is washed with water, then heated to 220° C. This process heat-bleaches and hardens the resin. At room temperature it is hard, brittle and a very pale amber color.

*Example 3.*—100 parts of a commercial mixture of meta and para cresol are mixed with 50 parts of benzaldehyde and 1 part of 35% aqueous hydrochloric acid is added. An exothermic reaction takes place and the mixture is maintained at 50° C. for about 3 hours. It is washed with water to remove the hydrochloric acid, then resinified with acetaldehyde in the manner described in Example 1. The finished resin is clear, brittle and substantially lighter in color than WW rosin.

*Example 4.*—150 parts of USP phenol are mixed with 90 parts of cyclohexanone and 10 parts of a 35% hydrochloric acid solution are added. The reaction mixture is maintained at 40–50° C. for 70 hours, then diluted with water and the crystalline material which separates is washed with dilute acetic acid. 60 parts of the light yellow crystalline reaction product are mixed with 6 parts of oxalic acid and heated to 130° C. 30 parts of gaseous acetaldehyde in admixture with illuminating gas is passed through the mixture for about 3 hours. The dark purple resin is washed with water, then heated to 230° C. to heat-bleach and harden. At 200° C. the dark purple resin melt changes in color to a dark brown, then to a light amber. At room temperature the final resin is hard, brittle and about the same color as WW rosin.

*Example 5.*—188 parts USP phenol are mixed with 72 parts n-butyraldehyde and 10 parts of hydrochloric acid (specific gravity 1.19) are added. The mixture is kept at 50° C. for 2 hours, then washed with water to remove the hydrochloric acid. The treated phenol is then resinified with acetaldehyde in the presence of oxalic acid in the manner described in Example 1. The final resin is hard, brittle and pale amber in color.

*Example 6.*—108 parts of a commercial mixture of meta and para cresol are mixed with 24 parts of n-butyraldehyde and 2 parts of a 35% aqueous hydrochloric acid solution are added. The mixture is maintained at 50° C. for 15 hours, then washed with water to remove the hydrochloric acid. 60 parts of the washed reaction product are heated to 120° C. with 6 parts of oxalic acid and 35 parts of gaseous acetaldehyde in admixture with illuminating gas are passed through it for about 4 hours. The resinous mass is washed with water, then heated to 230° C. to heat-bleach and harden. The final heat-bleached resin is hard, brittle and substantially lighter in color than WW rosin.

All of the resins described in the above examples when cooked with drying oils at ordinary varnish making temperatures, i. e., 260–290° C., yield varnishes which do not discolor when driers are present. The resins also are all substantially lighter than, or as light in color as, WW rosin. If made (including the final reaction with acetaldehyde) in the presence of mineral acids instead of oxalic acid, they are very dark in color, a small lump resembling coal or asphalt. However, when oxalic acid is used as the catalyst the dark resin which results is heat-bleached at temperatures above 180° C. to a pale amber, hard, brittle material.

*Example 7.*—15 parts of the resin prepared as described in Example 1 are mixed with 25 parts of raw tung oil and 5 parts of linseed oil which has previously been bodied by heating to 300° C. for 2½ hours (hereafter referred to in examples as bodied linseed oil). The mixture is heated to 270° C. for 10 minutes, then cooled to 250° C. and held at the latter temperature for another 10 minutes. The thickened varnish base is thinned with 45 parts of VM & P naphtha and 1½ parts of a 33⅓% lead-cobalt naphthenate drier solution in VM & P naphtha (hereafter referred to in examples as drier solution) are added.

The resins produced in Examples 2 and 3, can be made into varnish by following this same treatment.

The varnish is lighter in color than a varnish made in a similar manner in which the resin has been replaced by WW rosin. Moreover it remains light colored. If, however, the phenol is not pretreated with butyraldehyde and a resin and varnish made as described, the varnish darkens in the presence of driers within about two weeks to a dark red colored solution.

In the following example the resin referred to may be either the resin described in Examples 4, 5 or 6.

*Example 8.*—15 parts of resin are heated with 25 parts of raw tung oil and 5 parts of bodied linseed oil to 270° C. for 13 minutes, then at 250° C. for 8 minutes. The varnish base is thinned with 45 parts of VM & P naphtha and 1½ parts of drier solution are added.

The varnishes upon storage in metallic containers remain light-colored. Furthermore they dry in thin films in 3½ to 4 hours to firm, substantially non-discolored coatings.

*Example 9.*—108 parts of a commercial mixture of meta and para cresol are mixed with 12 parts of n-butyraldehyde and 2 parts of a 35% hydrochloric acid solution are added. The mixture is allowed to stand at 40–50° C. for about 15 hours. It is then washed thoroughly with water to remove the hydrochloric acid and dried by heating to 120° C.

60 parts of the above butyraldehyde-treated cresols are mixed with 6 parts of oxalic acid and heated to 120° C. 40 parts of gaseous acetaldehyde in admixture with illuminating gas are passed through the heated solution over a period of about 2½ hours. The dark resin thus formed is washed with water and heated to 220° C. to bleach and harden. At room temperature the material is a hard, brittle resin substantially lighter in color than WW rosin.

*Example 10.*—15 parts of the resin of Example 11 are heated with 25 parts of tung oil and 5 parts of bodied linseed oil at 270–280° C. for 12 minutes. The thickened varnish base is thinned with 45 parts of VM & P naphtha and 1½ parts of drier solution are added. The varnish is very pale in color, but discolors upon storage for long periods of time in metallic or glass containers. The resin contains a lower proportion of butyraldehyde than is desirable and the varnish is not permanently drier-color-stable. However, it requires a longer time to discolor than one made with a resin employing an untreated phenol.

*Example 11.*—100 parts of a commercial mixture of meta and para cresol are mixed with 100 parts of CP acetone and 20 parts of hydrochloric acid (specific gravity 1.19) are added. The mixture is allowed to stand at 50° C. for about 72 hours. It is then washed with water to remove hydrochloric acid and excess acetone and resinified with gaseous acetaldehyde in the presence of oxalic acid catalyst in the same manner as described in Example 2.

15 parts of the above light-colored resin are heated with 25 parts of raw tung oil and 5 parts of bodied linseed oil in the same manner as described in Example 8. The resulting varnish base is thinned with 45 parts of VM & P naphtha and 1½ parts of drier solution are added. The varnish is extremely light in color but upon storage in either metallic or glass containers for about two weeks it turns a deep red color. The latter varnish is in distinct contrast to the varnish of Example 8, which does not discolor, having been made with a methyl ethyl ketone-treated cresol-acetaldehyde resin.

In the varnish resin field there are several points to consider: First, the varnish resin must be light in color, that is, as light or lighter in color than WW rosin; second, the varnish made by cooking the resin and drying oil must also be light in color; third, the varnish film must be substantially color-stable, that is, it should not discolor upon drying and aging; fourth, the varnish must also be drier-color-stable, that is, upon storage with metallic driers it should not discolor; fifth, the varnish film should be resistant to water, weathering, acids, chemical fumes, and weak alkalies. The varnish resins of the present invention meet all of these conditions.

To recapitulate, therefore, the problem of the present invention is to produce light-colored, oil-soluble, film-color-stable, drier-color-stable varnish resins. This has been accomplished by the treatment of phenols with butyraldehyde or higher aldehydes or the equivalent methyl ethyl ketone or higher ketones prior to resinification with acetaldehyde. Acetone and aldehydes lower than butyraldehyde do not apply, these latter producing resins which give drier-color-unstable varnishes. Furthermore, it is not necessary that proportions of aldehyde or ketone calculated to form a diphenylol hydrocarbon be used but lower proportions can be employed, thus giving a mixture of diphenylol-substituted hydrocarbons and simple phenols. There is, however, a lower limit in the proportion of aldehyde below which discoloring varnish resins are produced. In the case of butyraldehyde this lower limit is about 20% butyraldehyde based on the phenol. In the case of the higher aldehydes the limit is decreased to about 10%. The same applies to the equivalent ketones.

The varnishes prepared from the resins of the present invention may be used with light colored pigments, since no discoloration takes place upon the drying of the enamel films. Driers, however, need not be incorporated but the varnishes may be baked to secure hard coatings. They may also be used to impregnate fabrics for the manufacture of oiled and waterproof cloth.

The resins are also readily compatible with nitrocellulose and may be used as extending agents for lacquers. They may also be employed without the cellulose esters in lacquers to which plasticizers have been added to increase the flexibility of the dried films. However, the main use of the resins is in drying oil varnishes.

As an alternative method of securing mixed acetaldehyde-butyraldehye resins which give drier-color-stable varnishes when heated with drying oils in the usual varnish kettle manner (heating resin with the full amount of oil to a high temperature), I may first react an untreated phenol, such as cresol, with acetaldehyde, then treat the viscous, or resinous reaction product with butyraldehyde or its equivalents. This method, however, is not advisable since oxalic acid, or its equivalent, should be employed in the final step in order to obtain light-colored resins. Butyraldehyde, and the higher aldehydes and ketones, do not react readily in the presence of oxalic acid, therefore a stronger acid must be used yielding dark colored resins. Hence, by reversing the procedure of the examples darker colored resins result. Oxalic acid may be used in this reverse procedure with butyraldehyde, but the reaction requires such a length of time as to be prohibitive in a commercial process. The preferred method, therefore, is to first treat the phenol with butyraldehye or its aforementioned equivalents in the presence of a strong acid which is subsequently removed by washing or neutralization. However, another method of making mixed butyraldehyde-acetaldehyde resins is to resinify the phenol by passing a mixture of gaseous acetaldehyde and gaseous butyraldehyde through a heated phenol-oxalic acid solution until a resin has formed, then heat-bleaching the resin. A resin formed in this manner yields film- and drier-color-stable varnishes.

When the term butyraldehyde-treated phenol is used in this invention it is understood to mean a phenol pretreated with butyraldehyde, or aldehydes of higher molecular weight than butyraldehyde, in the presence of acid condensing agents, the acid being subsequently removed. In the same manner by the term methyl ethyl ketone-treated phenol I mean a phenol which has been pretreated with methyl ethyl ketone, or ketones of higher molecular weight than methyl ethyl ketone, in the presence of acid condensing agents, the acid being subsequently removed.

Acetaldehyde, although it is an aldehyde similar chemically to formaldehyde and described in the literature as the obvious equivalent of formaldehyde, reacts in a distinctly different manner from formaldehyde. It is particularly suitable for the production of fatty oil-soluble resins when reacted with the simple phenols, such as ortho, meta or para cresol, mixed cresols, cresylic acid and the like. Although, in general, dark-colored resins result, resins extremely light in color may be secured as described in my copending application, Serial 39,621. Formaldehyde almost universally produces light-colored, simple phenol resins with all acid condensing agents. In certain cases, therefore, I may use a mixture of acetaldehyde and formaldehyde in the process of the present invention to resinfy the butyraldehyde- or methyl ethyl ketone-treated phenol. However, the amount of formaldehyde should be kept very low since relatively large amounts of formaldehyde tend to yield infusible resins or film-color-unstable varnishes.

The varnishes made with the resins described in my copending application, Serial 39,621, remain light-colored when no drier has been added to them. Therefore they may be stored without color change until they are to be used and driers added at that time. Since they remain drier-color-stable for at least a few days a varnishing or painting job may be easily finished before discoloration sets in. Since most paints have to be stirred to homogenize them, the driers may be added before stirring of the pigments and be dissolved without necessitating additional labor. Since the development of color is probably due to slight oxidation which is accelerated by the presence of driers, the varnish may be stored in containers from which the air has been withdrawn, or in which the air has been replaced by an inert atmosphere such as carbon dioxide.

The process of the present invention, however, provides a method whereby resins are produced which yield permanently drier-color-stable varnishes. It is advisable from a commercial point of view to use the smallest amount of butyraldehyde (or its equivalent) possible and yet secure a film- and drier-color-stable varnish resin, because at present the price of the higher aldehydes and ketones is high compared to the price of acetone, acetaldehyde, or formaldehyde, and by employing large amounts of the higher aldehydes and ketones the cost of the resin is increased. Larger amounts of butyraldehyde, or its aforementioned equivalents, however, may be used as dictated by requirements.

The varnishes made from the resins of the present invention may be dissolved in petroleum solvents such as VM & P naphtha, or the hydrosolvents, such as that known to the trade as "Solvesso". Hydrocarbon solvents such as toluol and xylol, or mixtures of toluol and alcohol, or butyl acetate, may also be used as well as the terpenes such as turpentine, α-pinene, dipentene and terpineol. Driers may be added to the varnish after dilution in the form of mineral spirit soluble naphthenate driers, or they may be cooked into the oil-resin base in the form of litharge or salts of lead cobalt and/or manganese.

In resinifying the pretreated phenol, liquid or gaseous acetaldehyde may be used. When liquid acetaldehyde is employed it is preferably used substantially 100%, or from 80% to 100%, and the condensation carried out in a closed system, that is, an autoclave or similar pressure device to minimize loss of acetaldehyde due to evaporation. If gaseous acetaldehyde is used it may be employed in any concentration in admixture with other hydrocarbon gases, such as ethylene, propylene, ethane, methane or propane or mixtures of these and other gases of higher molecular weight. The diluting gas allows a better control of the reaction and also provides a gas mixture which may be rapidly passed into the hot reaction mixture providing a large reacting surface and good agitation.

What I claim is:

1. A substantially film- and drier-color-stable varnish composition comprising a heat-treated mixture of a drying oil and an oxalic acid-catalyzed diphenylol-substituted hydrocarbon-acetaldehyde resin; said hydrocarbon radical containing 4 or more carbon atoms and said resin having the property of heat-bleaching from a substantially dark-colored resin to a substantially light-colored resin when heated above 180° C.

2. A substantially film- and drier-color-stable varnish composition comprising a heat-treated mixture of a drying oil and an oxalic acid-catalyzed dicresylol-substituted hydrocarbonacetaldehyde resin; said hydrocarbon radical containing 4 or more carbon atoms and said resin having the property of heat-bleaching from a substantially dark-colored resin to a substantially light-colored resin when heated above 180° C.

3. A substantially film- and drier-color-stable varnish composition comprising a heat-treated mixture of a drying oil and an oxalic acid-catalyzed dicresylolbutane-acetaldehyde resin; said resin having the property of heat-bleaching from a substantially dark-colored resin to a substantially light-colored resin when heated above 180° C.

4. An oxalic acid-catalyzed diphenylol-substituted hydrocarbon-acetaldehyde resin; said hydrocarbon radical having 4 or more carbon atoms and said resin having the property of heat-bleaching from a substantially dark-colored resin to a substantially light-colored resin when heated above 180° C.

5. An oxalic acid-catalyzed dicresylol-substituted hydrocarbon-acetaldehyde resin; said hydrocarbon radical containing 4 or more carbon atoms and said resin having the property of heat-bleaching from a substantially dark-colored resin to a substantially light-colored resin when heated above about 180° C.

6. An oxalic acid-catalyzed dicresylolbutane-acetaldehyde resin; said resin having the property of heat-bleaching from a substantially dark-colored resin to a substantially light-colored resin when heated above 180° C.

7. A substantially film- and drier-color-stable varnish composition comprising the heat-treated mixture of a drying oil and the resin of claim 4.

8. A substantially film- and drier-color-stable varnish composition comprising the heat-treated mixture of a drying oil and the resin of claim 5.

9. A substantially film- and drier-color-stable varnish composition comprising the heat-treated mixture of a drying oil and the resin of claim 6.

10. A process of making light-colored phenolic-acetaldehyde resin comprising heating a diphenylol-substituted hydrocarbon, said hydrocarbon radical containing 4 or more carbon atoms, above 90° C., passing a gaseous mixture comprising gaseous acetaldehyde and hydrocarbon gases through said oxalic acid-diphenylol-substituted hydrocarbon mixture until a substantially dark-colored resin is formed, heating said dark-colored resin above 180° C., whereby said resin is heat-bleached to a substantially light-colored resin having the property of dissolving in drying oils to form substantially film- and drier-color-stable varnishes.

11. The process of claim 10 in which the diphenylol-substituted hydrocarbon is a dicresylol-substituted hidrocarbon.

12. The process of claim 10 in which the diphenylol-substituted hydrocarbon is a dicresylolbutane.

13. Resin made in accordance to the process of claim 10.

14. Resin made in accordance to the process of claim 11.

15. Resin made in accordance to the process of claim 12.

JOHN B. RUST.